United States Patent
Baldwin et al.

(10) Patent No.: US 7,168,085 B2
(45) Date of Patent: Jan. 23, 2007

(54) TIME-BASED SELECTION OF EPG DATA DESTINED FOR LOW RESOURCE CLIENTS

(75) Inventors: James Armand Baldwin, Redwood City, CA (US); Peter T. Barrett, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 1186 days.

(21) Appl. No.: 10/078,330

(22) Filed: Jan. 31, 2002

(65) Prior Publication Data

US 2003/0149979 A1 Aug. 7, 2003

(51) Int. Cl.
*H04N 5/445* (2006.01)

(52) U.S. Cl. .............................. 725/50; 725/54; 725/37; 711/133

(58) Field of Classification Search .................... 725/50
See application file for complete search history.

(56) References Cited

U.S. PATENT DOCUMENTS

| | | | |
|---|---|---|---|
| 3,824,561 A | 7/1974 | Wolf | |
| 5,038,211 A | 8/1991 | Hallenbeck | |
| 5,652,613 A * | 7/1997 | Lazarus et al. | ............... 725/50 |
| 5,758,259 A | 5/1998 | Lawler | |
| 6,032,197 A | 2/2000 | Birdwell et al. | |
| 6,928,653 B1 * | 8/2005 | Ellis et al. | ..................... 725/50 |
| 2001/0014976 A1 | 8/2001 | Roop et al. | |

FOREIGN PATENT DOCUMENTS

| | | |
|---|---|---|
| EP | 1 030 516 A2 | 8/2000 |
| EP | 1 107 132 A2 | 6/2001 |
| WO | WO 99/65242 | 12/1999 |

* cited by examiner

*Primary Examiner*—Christopher Grant
*Assistant Examiner*—Justin Shepard
(74) *Attorney, Agent, or Firm*—Lee & Hayes, PLLC (57) ABSTRACT

Program data for use in electronic program guides is selected for storage at a low resource client according to a preference for current program data over program data for a future time. In the described implementation, a memory representative of the client memory is disproportionately allocated for different time units (e.g., 24-hour days) to be represented in an electronic program guide. Analysis is conducted as to whether program data for the different time units can fit in the portions of memory and adjustments to the amount of program data for respective time units are made. Different-size sets of program data are eventually selected such that more program data will be stored in the portion of memory corresponding to the current time unit and progressively less program data will be stored in other portions of memory corresponding to future time units.

25 Claims, 5 Drawing Sheets

TIME-BASED SELECTION OF EPG DATA DESTINED FOR LOW RESOURCE CLIENTS

TECHNICAL FIELD

This invention relates to television entertainment architectures in which program data is generated, processed, and distributed to low resource clients, such as set top boxes. More particularly, this invention relates to selecting program data for inclusion in an EPG data file to be stored at low resource clients.

BACKGROUND

Electronic program guides (EPGs) enable TV viewers to navigate through an onscreen program guide and locate shows. With the guides, viewers can look at schedules of current and future programming, set reminders for upcoming programs, or enter instructions to record one or more shows. The amount of program data available for EPGs is dependent upon the resource environment at the client. In a low-resource environment, meaning the client has limited memory and/or processing resources, it is difficult to display program schedule information for multiple days because the client is not capable of storing the data required to produce such schedules. Yet, the viewer is often interested in program information of a future date.

Accordingly, for such low-resource environments, there is a need for techniques to ensure that the most useful program data for a given time duration is stored in the limited memory resources of the client.

SUMMARY

Program data for use in electronic program guides are selected for storage at a low resource client according to a preference for storing more program data related to a current time than for program data related to a future time. In the described implementation, a memory representative of the client memory is disproportionately allocated for different time units (e.g., 24-hour days) to be represented in an electronic program guide. Analysis is conducted as to whether all of the program data for the different time units can fit in the allocated portions of memory. Based on the analysis, adjustments are made to the amount of program data for respective time units. As a result, different-size sets of program data are ultimately selected for distribution and storage at the client, with more program data for the current time unit being selected and progressively less program data for future time units being selected.

DETAILED DESCRIPTION

The following discussion is directed to television entertainment systems, such as interactive TV networks, cable networks that utilize electronic program guides, and Web-enabled TV networks. Clients in such systems range from full-resource clients with substantial memory and processing resources (e.g., TV-enabled personal computers, TV recorders equipped with hard-disks) to low-resource clients with limited memory and/or processing resources (e.g., traditional set-top boxes). While aspects of the systems and methods described below can be used in any of these systems and for any types of clients, they are particularly well-suited for systems with low-resource clients. Hence, the following discussion describes the systems and methods in the context of a low-resource environment.

Television Entertainment System

Figure 1:
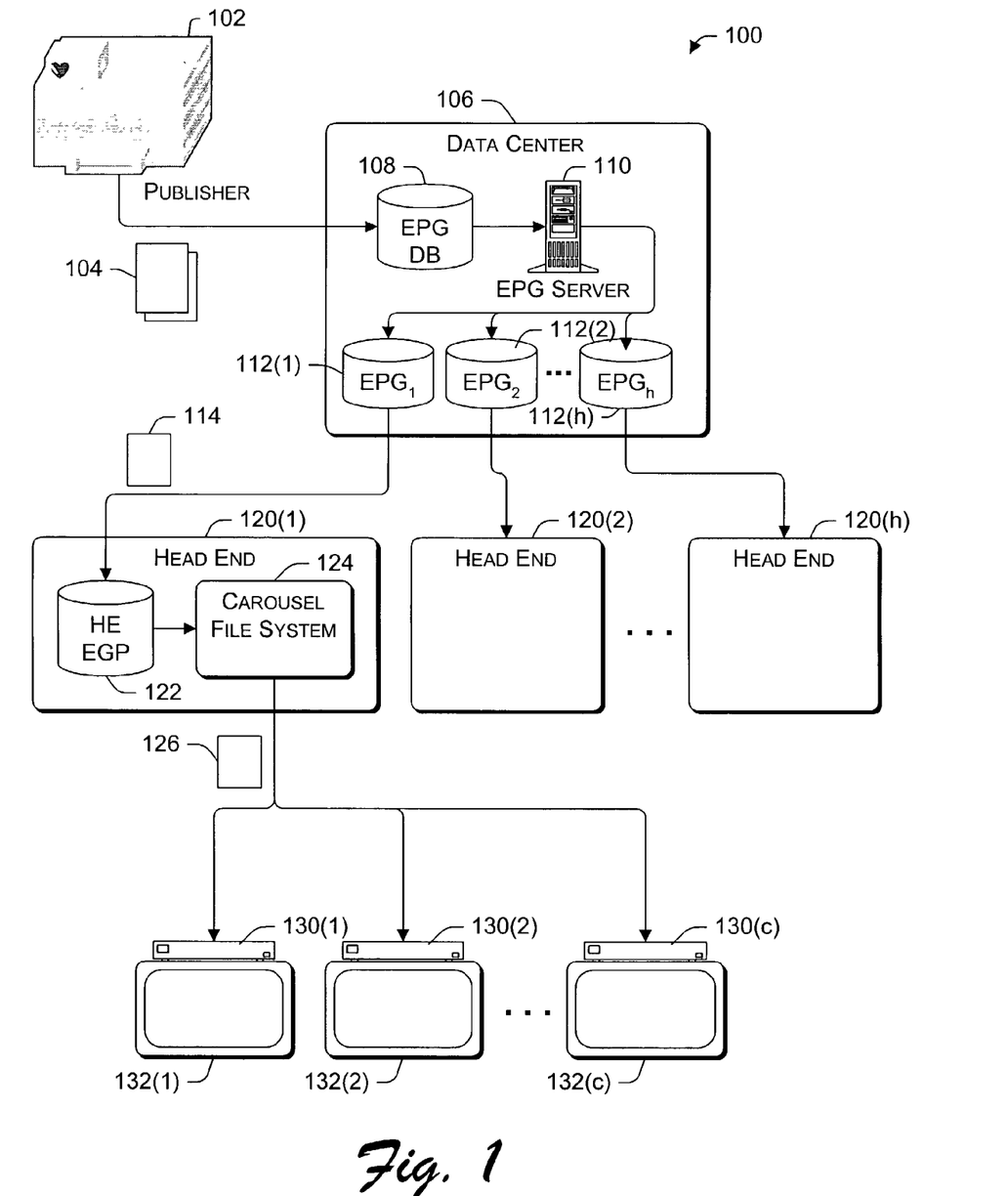
FIG. 1 illustrates a television entertainment system including a publisher to generate program data, a data center to process the program data, and one or more head ends to distribute the program data to multiple clients.

FIG. 1 shows a television entertainment system 100 that facilitates distribution of program data from a publisher to the viewers. System 100 includes a publisher 102 that creates the program data. One example of a publisher 102 is the Tribune Corporation which generates data for interactive television networks. As used herein, program data refers to the type of data that might be used by an electronic program guide (EPG) and/or to facilitate interactive television functionality. Program data includes program titles, ratings, characters, description, actor names, year made, and so on. The terms "program data" and "EPG data" are used interchangeably throughout this disclosure.

The EPG data is transferred as an electronic file 104 from the publisher 102 to a data center 106. As one example, the program data 104 is transferred using a file transfer protocol (FTP) over a TCP/IP network (e.g., Internet, UNIX, etc.) to the data center 106. The electronic file 106 is stored in an EPG database 108 at the data center 106.

The original version of the EPG data contains all of the programming information for multiple days. An EPG server 110 resides at the data center 106 to process the EPG data prior to distribution. The processing involves one or more techniques to condition the EPG data so that a low resource client can handle the data more effectively. Low resource clients, such as a set top box, are typically characterized as having limited memory and/or processing resources. Such clients may not be able to store the entire original version of the EPG data. With limited resources at the client, the processes performed by the EPG server 110 are helpful to precondition the EPG data into a more suitable form for storage and processing at the client.

Among other processes, the EPG server 110 is configured to reduce the amount of EPG data so that it can be stored at low-resource clients. The EPG server 110 might also alter the format or structure of EPG data 104 to enable easier searching or other processes at the clients. The EPG server 110 might also compress the EPG data prior to its distribution.

The EPG server 110 creates different versions of the program data for different head end services to account for programming preferences and lineups. For example, the EPG server 110 limits the EPG data to those channels that are relevant to the respective head ends. In the illustrated example, the EPG server 110 creates multiple versions of the EPG data, which are designated as $EPG_1, EPG_2, \ldots, EPG_h$, and stores them in respective databases 112(1), 112(2), ..., 112(h). The data center 106 transfers the head end versions of the EPG data as electronic files 114 to associated head end services 120(1), 120(2), . . . , 120(h) using, for example, FTP or other suitable transfer protocols over a network.

At individual head end services, as represented by service 120(1), the EPG data is stored in a head end database 122. A carousel file system 124 repeatedly broadcasts the EPG file 126 over an out-of-band (OOB) channel to the clients 130(1), 130(2), . . . , 130(c). The distributed EPG file 126 may or may not be identical to the file 114 received from the data center 106. Distribution from the head ends 120 to the clients 130 may be accommodated in a number of ways, including cable, RF, microwave, network (e.g., Internet), and satellite.

In the illustrated implementation, the clients 130 are embodied as set top boxes (STBs) connected to associated televisions 132(1), 130(2), . . . , 132(c). The clients 130 are often equipped with sufficient processing and storage capabilities to store and run an operating system and a few programs. Examples of programs stored on a client might include a Web browser, an electronic programming guide, a personal scheduler, and so forth. Although the STBs are shown separately from the television sets, they may alternatively be built into the television sets as integral units. Furthermore, in other implementations, the clients may be embodied as other devices capable of handling EPG data, such as a broadcast-enabled computer, an information appliance, or the like.

Exemplary EPG Server

Figure 2:
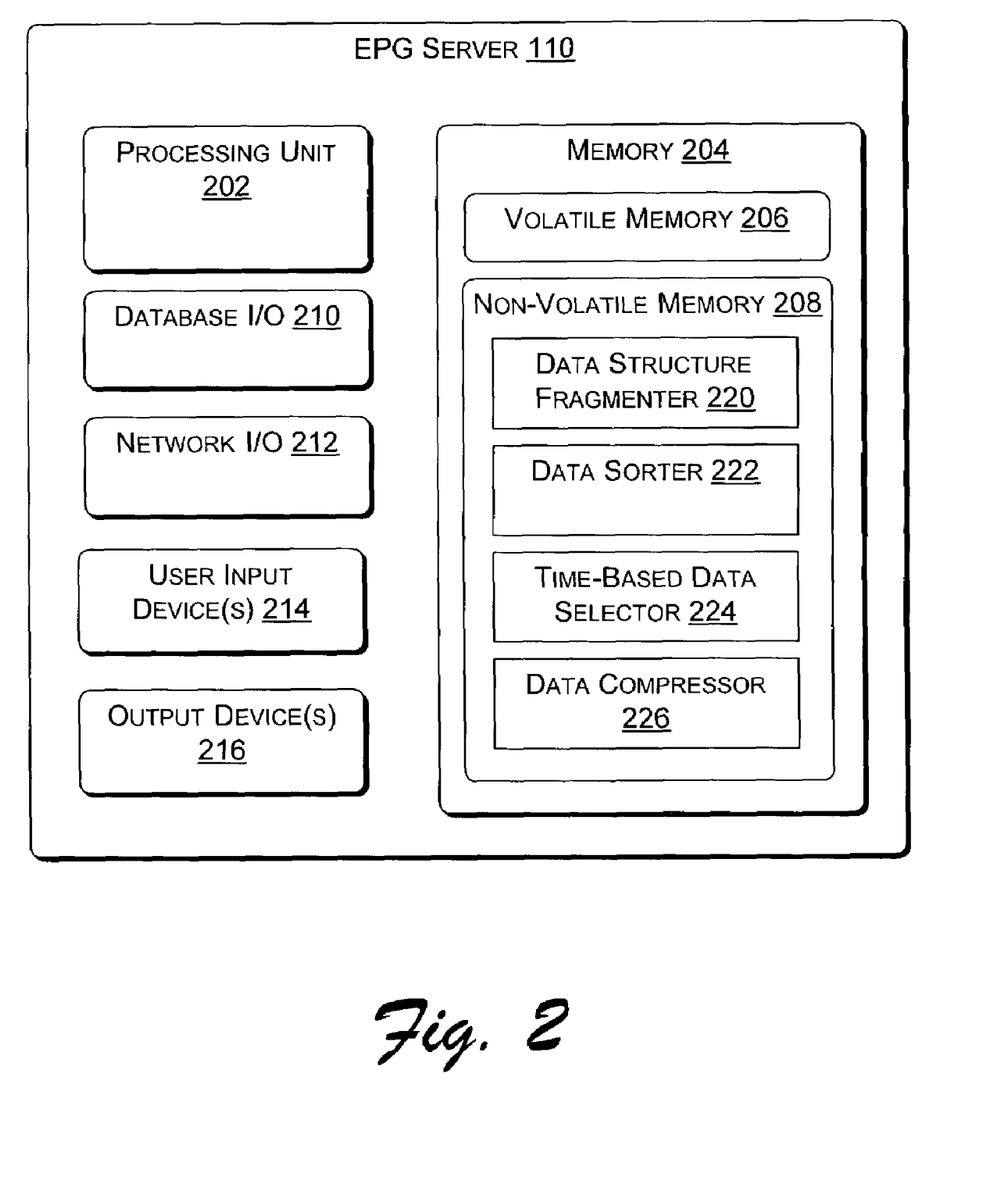
FIG. 2 is a block diagram of a server computer resident at the data center to process the program data.

FIG. 2 shows an exemplary implementation of the EPG server 110. It has a processing unit 202 and memory 204. Memory 204 includes volatile memory 206 (e.g., RAM) and non-volatile memory 208 (e.g., ROM, flash, floppy disk, hard disk, CD-ROM, disk array, etc.). The server 110 may be further equipped with a database I/O 210 to interface with the EPG database 108 and/or version databases 112(1)–112(h) and a network I/O 212 to provide access to one or more networks. The server 110 may optionally be equipped with one or more input devices 214 (e.g., keyboard, mouse, track ball, touch panel screen, etc.) and one or more output devices 216 (e.g., display, printer, etc.).

One or more programs are stored in memory 204 and executed on processing unit 202 to process the EPG data. The programs include a data structure fragmenter 220, a program table constructor 222, a time-based data selector 224, and a data compressor 226. The EPG server 110 also runs an operating system (not shown), such as a Windows® brand operating system from Microsoft Corporation, or a Unix-based operating system.

The various processes performed by the EPG server 110 are intended to place the EPG data in better condition for handling by the low resource client. The data structure fragmenter 220 pre-formats the data by at the server for use by the client. The client 130 has previously designated an arbitrary data set size for a particular application, such as an EPG application, and allocates a block of memory in segments of that size. The arbitrary size is communicated to the EPG server 110, and the data structure fragmenter 220 "fragments" the data in advance of delivery to the client 130. The client-designated arbitrary data size is thus guaranteed by the server 110 to be the size of data transmitted to the client. Therefore, when the client 130 receives the data, the client can allocate the data packets to the pre allocated segments in memory without making system calls to the memory.

The data sorter 222 pre-sorts EPG data to improve searching at the client. The EPG data is pre-sorted according to a type of field, such as a title. The data sorter 222 constructs a table with the pre-sorted data and this table is used by the client to facilitate fast searches, even though the client has limited processing resources.

The time-based data selector 224 selects which program data to be included in the file to be downloaded to the client. Low resource clients may not be able to store and display program schedule information for multiple days because of limited memory. The time-based selector 224 selectively stores more data for a current time period represented by the EPG (e.g., the current day) and progressively less data over time for subsequent time units (e.g., next several days). This enables a rich display of information for the time period in which viewers are most likely interested, while offering some additional subset of data for future programming.

The data compressor 226 can be used to compress data destined for the client to a compressed format that remains easily searchable at the client. In one implementation, the data compressor 226 makes an initial pass through the data and constructs a table identifying the most frequently used character sequences. During a subsequent pass, the data compressor 226 compresses the data string by substituting a value for the most frequent character sequences. The data compressor 226 constructs a code table that tracks which values are substituted for the character sequences. The compressed data file and code table can then be downloaded to the client for decompression.

It is noted that the processes carried out by the EPG server are described as being implemented in software. However, in alternative implementations, some or all of these processes may be implemented in firmware and/or hardware.

Exemplary Client

Figure 3:
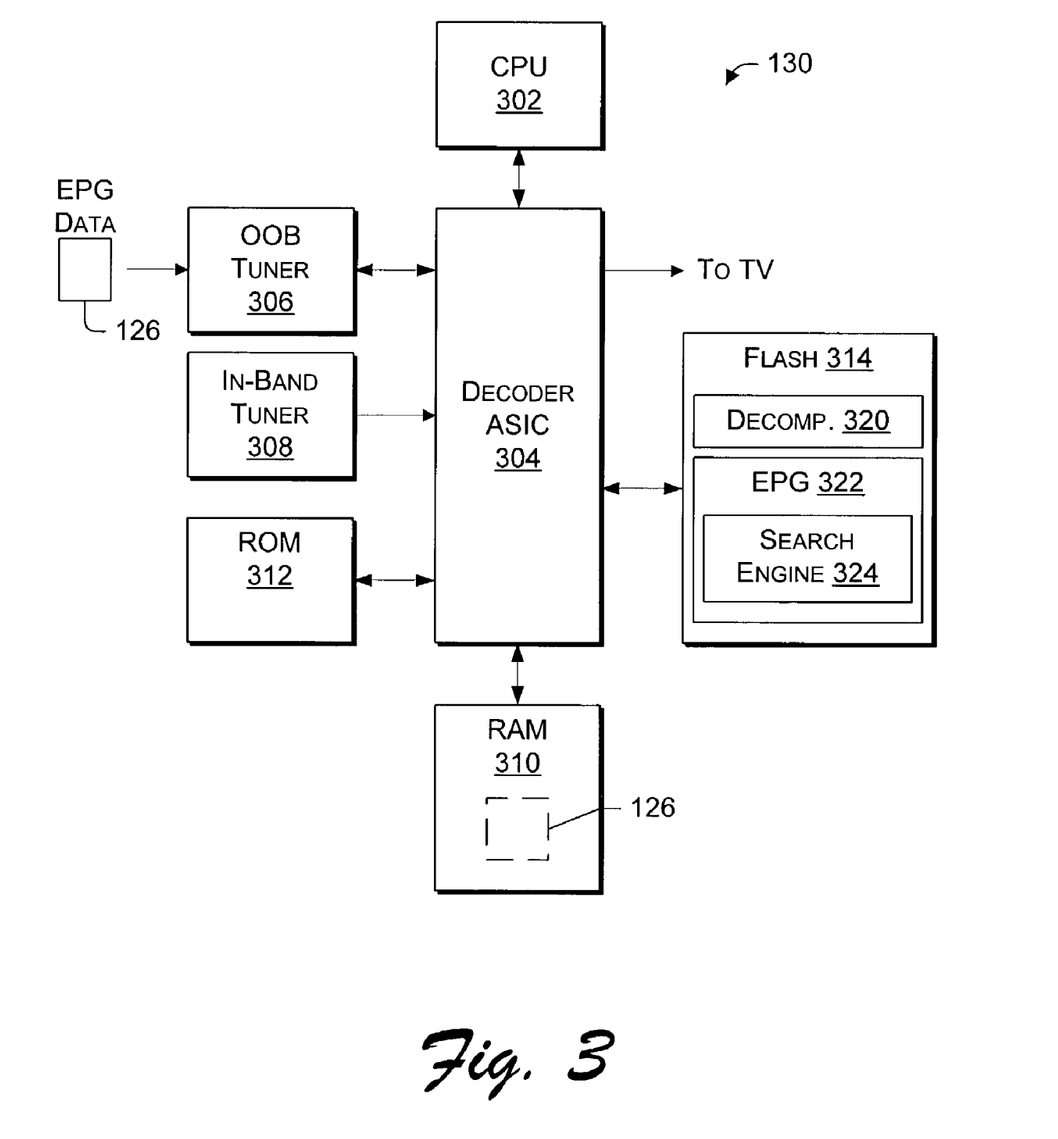
FIG. 3 is a block diagram of an exemplary client implemented as a set top box.

FIG. 3 shows an exemplary client 130 implemented as a set-top box. The client 130 has a central processing unit (CPU) 302 coupled to a decoder ASIC (application specific integrated circuit) 304. In addition to decoder circuitry, ASIC 304 may also contain logic circuitry, bussing circuitry, and a video controller. The client 130 further includes an out-of-band (OOB) tuner 306 to tune to the broadcast channel over which the EPG data file 126 is downloaded. One or more in-band tuner 308 is also provided to tune to various television signals. These signals are passed through the ASIC 304 for audio and video decoding and then to an output to the television set. With the tuners and ASIC 304, the client is equipped with hardware and/or software to receive and decode a broadcast video signal, such as an NTSC, PAL, SECAM or other TV system video signal and provide video data to the television set.

One or more memories are coupled to ASIC 304 to store software and data used to operate the client. In the illustrated implementation, the client has random access memory (RAM) 310, read only memory (ROM) 312, and flash memory 314. RAM 310 stores data used by the client, including the EPG data file 126 as well as any compression table used to decompress the file. ROM 312 stores an operating system (not shown).

One or more programs may be stored in the ROM 312 or in the flash memory 314. In the illustrated example, the flash memory 314 stores a decompression program 320 that can be executed to decompress the EPG data file 126. An EPG program 322 is also stored in the flash memory 314 to operate on the EPG data 126. The EPG program 322 may include a search engine 324 to search the EPG data in response to queries submitted by the viewer. The search engine might be used, for example, to locate particular television shows by title, or find shows with a particular rating, or identify programs with selected actors.

The client 130 may further include other components, which are not shown for simplicity purposes. For instance, the client is typically equipped with hardware and/or software to present a graphical user interface to a viewer, by which the viewer can navigate the EPG, or (if enabled) to access various Internet system network services, browse the Web, or send email. Other possible components might include a network connection (e.g., modem, ISDN modem, etc.) to provide connection to a network, an IR interface, display, power resources, etc. A remote control may further be provided to allow the user to control the client.

Time-Based EPG Data Selection

Low resource client 130 has limited memory resources. For example, set top boxes are typically manufactured with a fixed amount of memory that satisfies the manufacturer's price/performance criteria. A portion of this memory is allocated to hold EPG data. The amount of EPG data to be transmitted down to the set top box might be expected to consume, for example, no more than 500K bytes of memory.

Accordingly, one process performed on the EPG data prior to delivery to the client concerns selecting which items of the EPG data to send to the client. Items believed to be of greater importance to the viewer are selected for transmission, whereas items deemed to be of less importance are not. In the example illustrated in FIG. 1, the data selection process is performed by the EPG server 110 of the data center 106, and particularly by the time-based data selector 224. The EPG server 110 examines the publisher-created EPG data 104 stored in the EPG database 108 and selectively resolves that original EPG data into a smaller data set. It is noted that the EPG data selection process may be performed at other computing sites in system 100, including at the head end services 120.

One factor in determining what constitutes suitable items of the EPG data is time. With limited memory at the client, the selection process attempts to ensure that at least the timeliest EPG data is downloaded to the client. EPG data for future programs can be added to the downloaded file if there is available memory. In one implementation, time increments used in the selection process correspond to 24-hour days. Thus, the selection process chooses more EPG data for the current day and progressively less EPG data over time for subsequent days. This enables the richest display of information for the day in which viewers are most likely look at program schedules, but still provides some subset of data for future programming.

Figure 4:
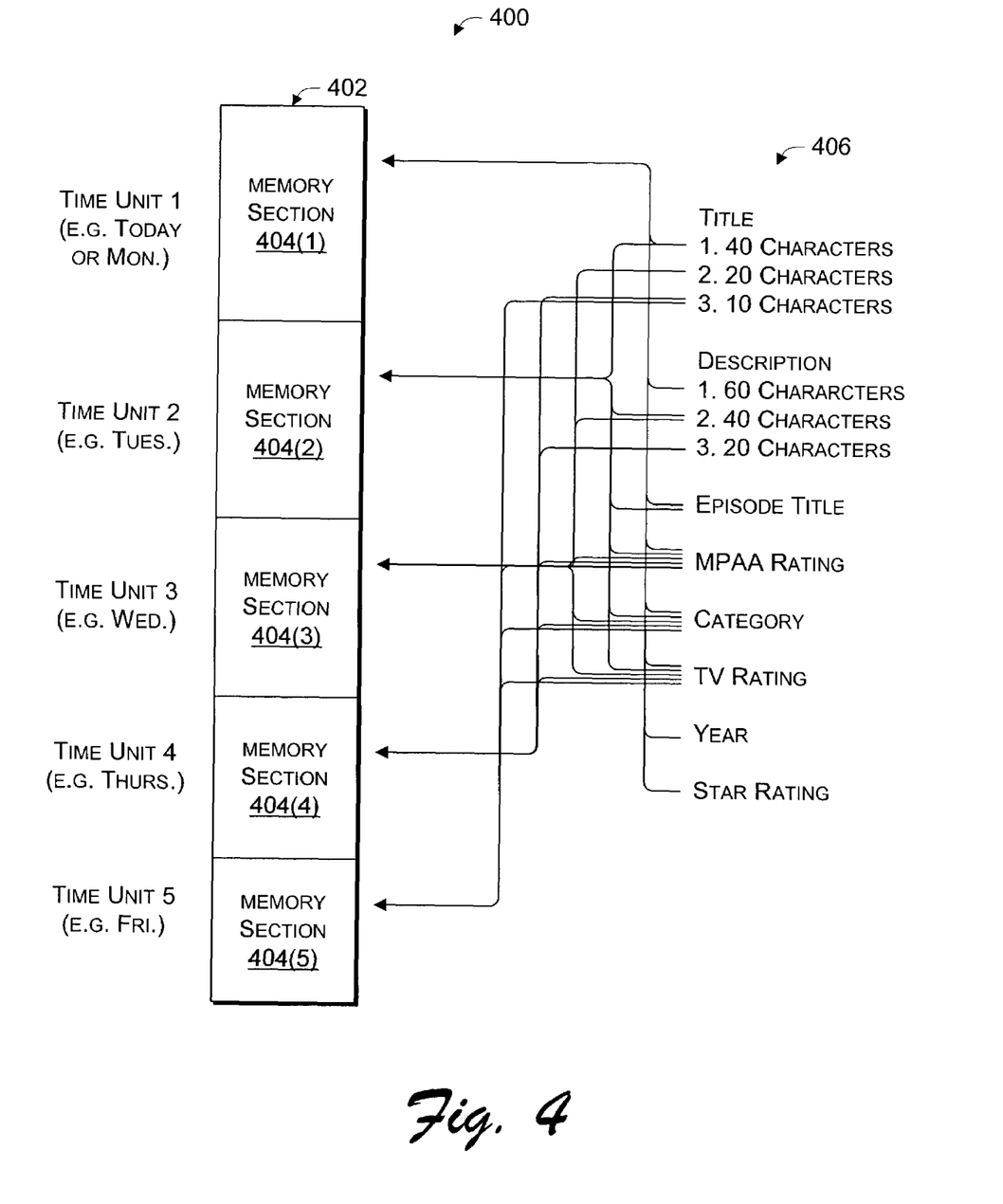
FIG. 4 illustrates memory space available for storing program data. The memory space is disproportionately allocated among multiple time units such that different amounts of program data are placed in the different-size sections of memory.

FIG. 4 illustrates one exemplary implementation of the selection process 400. The process utilizes a memory 402 that represents the client memory that will be used to store the EPG data. The size of memory 402 thus corresponds to the size of the client memory. Memory 402 is disproportionately allocated among multiple time units represented in the EPG. Different-size sets of EPG data are then selected to fill the allocated memory portions.

The time units can be over any predetermined interval, with one suitable size being a 24-hour day. Accordingly, in this example, the memory space 402 is allocated as five sections 404(1)–404(5) for a five-day period from a current day (e.g., Monday) to five days in the future (e.g., Friday). The amount of memory allocated for each day is dependent upon how close in time the day is to the current day. This is illustrated by the largest allocated section 404(1) corresponding to the current day (e.g., Monday) and the smallest allocated section 404(5) corresponding to the furthest day away from the current day (e.g., Friday).

At the EPG server 110, the data selector 224 chooses items of the EPG data to be placed in each memory section 404 according to how much space is allocated for that time unit. Since the current day has the most allocated space, more EPG data pertaining to current-day programming is selected for inclusion in the EPG file to be sent to the client. For the furthest day away (e.g., Friday), less EPG data for Friday is selected for inclusion in the EPG file.

For discussion purposes, a sample of EPG data 406 is listed in FIG. 4. Among other items, the EPG data for a program typically includes a program title, a description, an episode title, an MPAA rating, a category, a TV rating, a year that the show was made, and a star rating. Some data may be represented in multiple ways to accommodate space concerns. For instance, title data might consist of three versions: a full title with 40 or less characters, a mid-length title with 20 or less characters, and a short title with 10 or less characters. Similarly, there might be three versions of the description.

Different collections of the EPG data 406 are placed in the various memory sections 404(1)–(5) depending upon available space allocated for that day. To illustrate this point, suppose that the data selector 224 places the following collection of EPG data in the memory section 404(1) associated with Monday:

40 character title
60 character description
episode title
MPAA rating
category
TV rating
Year
Star Rating Then, for the smaller memory section 404(5) associated with Friday, the data selector 224 might select only the following collection of EPG data:

10 character title
MPAA rating
category
TV rating

The EPG data included in Friday's memory section 404(5) is sufficient for the viewer to browse the future programming and to set various conditions, such as reminders or recording events.

Figure 5:
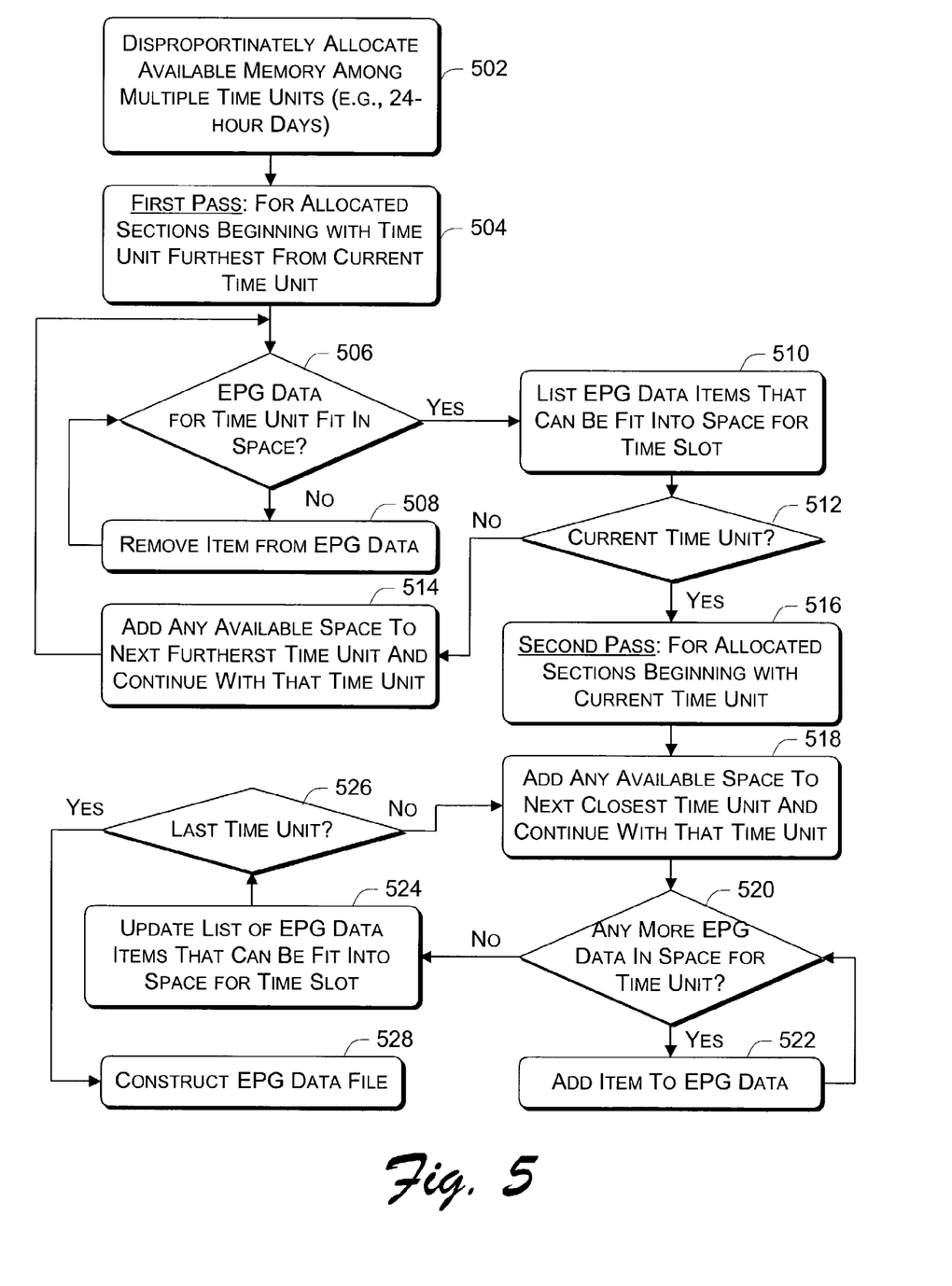
FIG. 5 is a flow diagram of the data selection process used to determine which items of program data are placed in the allocated memory for various time units.

FIG. 5 shows one example of a selection process 500 performed by the time-based data selection program 224 executing at the EPG server 110. Generally, the process 500 can be thought of as two passes over the time-divided memory structure to dynamically store as much EPG data in each of the memory sections. The first pass begins at the day furthest in the future and works backwards toward the present day. The second pass starts with the current day and works forward into the future. In both passes, unused space from one day is shifted to the next day. The process 500 may be implemented in software, firmware, hardware, or a combination of these. The process is illustrated as a set of operations that may be implemented as computer-executable instructions that can be executed by a computer, such as EPG server 110.

At block 502, the process allocates disproportionate amounts of the memory 402 (FIG. 4) among the time units. For discussion purposes, suppose the total amount of memory available for EPG data is 500K bytes and the process allocates this memory over five 24-hours time slots as represented in FIG. 4. As an initial allocation, suppose the section 404(1) for Monday is allocated 120K bytes, the section 404(2) for Tuesday is allocated 110K bytes, the section 404(3) for Wednesday is allocated 100K bytes, the section 404(4) for Thursday is allocated 90K bytes, and the section 404(5) for Friday is allocated 80K bytes.

At block 504, the first or future-to-present pass is initiated, starting with the section corresponding to the furthest time in the future for which there is EPG data. Here, there are five days of program listings and the fifth or furthest day out from Monday is Friday. At block 506, the process determines whether all of the EPG data for Friday will fit in the allocated space 404(5) (e.g., 80K bytes). If there is more EPG data than available space (i.e., the "No" branch from block 506), the process removes one or more items of EPG data (block 508) and reevaluates whether the reduced data set fits in the allocated space. This loop is repeated until a set of EPG data that fits the space is found.

The removal of EPG data may be handled in a number of ways. For instance, the EPG data may be prioritized in some manner that establishes the order in which items are removed. For the EPG data shown in FIG. 4, one possible order might be as follows:

1. eliminate Star Rating
2. eliminate Year
3. eliminate 60 character description
4. eliminate 40 character title
5. eliminate 40 character description
6. eliminate 20 character title
7. eliminate 20 character description
8. eliminate 10 character title
9. eliminate episode title
10. eliminate MPAA rating
11. eliminate Category
12. eliminate TV Rating Another possible approach is to assign level-of-detail values that correspond to diminishing sets of EPG data. For instance, a first value might represent the fewest number of acceptable items in the EPG data for a give time unit; another value might represent the next biggest set of EPG data; and so one. With this approach, the operation of block 508 is to find the appropriate level-of-detail value for the available memory space.

Once the appropriate amount of EPG data is found to fit the allocated space for Friday (i.e., the "yes" branch from block 506), the EPG data (or corresponding level-of-detail value) is temporarily stored memory (block 510). At block 512, the process determines whether all allocated time units in the first pass have been considered. In this case, only Friday has been evaluated. Thus, at block 514, the process continues to the next time unit, which is Thursday in our example. Additionally, the process may optionally add any available space into the allocation for the next day to be considered. For instance, suppose that the first iteration found that 78K bytes of EPG data fit the allocated 80K bytes. The additional 2K bytes would then be shifted to the memory section 404(4) for Thursday to enlarge that allocation to 92K bytes of memory.

The first pass through the available memory continues for each day, from Friday back to Monday. With each iteration, any additional memory space is moved to the next day to accept potentially more EPG data for that day.

Once the EPG data set for the current time unit (i.e., Monday) is found and recorded at block 510, the process begins the second pass at block 516. This present-to-future pass begins with the next closest time unit (i.e., Tuesday). Any leftover space that was not used to hold the EPG data for Monday is added back to the available space for Tuesday to see if any additional data can now be fit into Tuesday's allocated space (block 518).

At block 520, the process determines whether any more EPG data for Tuesday will fit in the allocated space. With the additional space moved over from Monday, there may be just enough space to add one or more EPG data items or modify the level-of-detail value. If more EPG data can be added, the process enlarges the EPG data for that day (block 522) and reevaluates with the enlarged data set whether even more data may be included. This loop is repeated until a set of EPG data that fits the space is found.

Once the appropriate amount of EPG data is found to fit the allocated space for Tuesday (i.e., the "no" branch from block 520), the data items and/or corresponding level-of-detail value associated with this day is updated to reflect the additional subject matter (block 524). At block 526, the process determines whether all allocated time units in the second pass have been considered. If not, the next iteration is performed for the next time unit (e.g., Wednesday) and any available space is moved into the allocation for that time unit. The second pass through the available memory continues for each day, from Tuesday back to Friday.

When all time units are considered (i.e., the "yes" branch from block 526), the EPG data file is constructed (block 528). The resulting file includes varying amounts of data with more EPG data being contained in the current day and progressively less EPG data for subsequent days. The space used to store the various days of EPG data will most likely be different from the initially allocated amounts as a result of the two-pass process. As an example, the final distribution of available memory space might be 123K for Monday's EPG data, 109K for Tuesday's EPG data, 104K for Wednesday's EPG data, 88K for Thursday's EPG data, and 76K for Friday's EPG data. In any event, the EPG data is guaranteed to fit within the pre-allocated space at the client (e.g., the 500K bytes of memory).

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method comprising:
   allocating different-size portions of memory to store program data for corresponding time units represented in an electronic program guide; and
   selecting different-size sets of the program data for storage in the portions of memory such that more of the program data will be stored in one portion of memory corresponding to one time unit and less of the program data will be stored in another portion of memory for another time unit, wherein the selecting comprises:
      making a first pass from a furthest time unit back toward a current time unit and determining at each time unit whether the program data for the time unit fits in the portion of memory allocated for the time unit and shifting any remaining space to the portion of memory allocated for a next time unit closer to the current time unit; and
      making a second pass from the current time unit out to the furthest time unit and determining at each time unit whether any additional program data for the time unit can be added to the portion of memory allocated for the time unit and shifting any remaining space to the portion of memory allocated for a next time unit closer to the furthest time unit.

2. A method as recited in claim 1, wherein the time units comprise 24-hour days.

3. A method as recited in claim 1, wherein the selecting further comprises:
evaluating whether the program data for a particular time unit is able to fit in the portion of memory allocated for the time unit; and
in an event that the program data does not fit, reducing the program data for the particular time unit until a reduced set of program data is able to fit in the portion of memory allocated for the particular time unit.

4. A method as recited in claim 3, wherein the selecting further comprises shifting any remaining available space not used to store program data to another portion of memory corresponding to another time unit.

5. A method as recited in claim 1, further comprising constructing a data file, with the selected sets of the program data, for distribution to a client that executes the electronic program guide.

6. A method for selecting program data for distribution to an electronic program guide, the method comprising:
evaluating whether program data for a time period in the electronic program guide is able to fit in client memory allocated for the time period;
in an event that the program data does not fit in the client memory, reducing the program data until a subset of program data is found to fit in the memory allocated for the time period;
making a first pass from a furthest time period back toward a current time period and determining at each time period whether the program data fits in the portion of memory allocated for the time period and shifting any remaining space to the portion of memory allocated for a next time period closer to the current time period; and
making a second pass from the current time period out to the furthest time period and determining at each time period whether any additional program data can be added to the portion of memory allocated for the time period and shifting any remaining space to the portion of memory allocated for a next time period closer to the furthest time unit.

7. A method as recited in claim 6, further comprising initially allocating the client memory for storage of program data for multiple time periods such that more client memory is allocated for a current time period than is allocated for a future time period.

8. A method as recited in claim 7, further comprising repeating the evaluating and the reducing for each of the multiple time periods to produce different-size subsets of program data for associated time periods.

9. A method as recited in claim 6, further comprising constructing a data file containing the subset of program data.

10. A method for selecting program data for an electronic program guide, the electronic program guide executing on a client having a memory, the method comprising:
initially allocating different-size portions of memory representative of the client memory for different time units represented in the electronic program guide;
testing whether program data for the different time units fits in the respective different-size portions of memory;
adjusting quantities of the program data for the different time units to identify an entire set of program data for storage at the client, wherein different quantities of the program data are stored for the different time units;
making a first pass from a furthest time unit back toward a current time unit and determining at each time unit whether the program data for the time unit fits in the portion of memory allocated for the time unit and shifting any remaining space to the portion of memory allocated for a next time unit closer to the current time unit; and
making a second pass from the current time unit out to the furthest time unit and determining at each time unit whether any additional program data for the time unit can be added to the portion of memory allocated for the time unit and shifting any remaining space to the portion of memory allocated for a next time unit closer to the furthest time unit.

11. A method as recited in claim 10, wherein the time units comprise 24-hour days.

12. A method as recited in claim 10, wherein the allocating comprises allocating more of the memory for time units that are closer in time and less of the memory for time units that are further out in time.

13. A method as recited in claim 10, further comprising constructing a data file containing the quantities of the program data found to fit in the portions of memory associated with the different time units, the data file being configured for transmission to the client.

14. A method for constructing a data file containing program data for an electronic program guide, the method comprising:
initially allocating memory designated to hold the program data so that proportionally more memory is initially allocated to a current time unit and progressively less memory is initially allocated to one or more future time units;
during a first pass beginning with a portion of memory corresponding to a time unit that is furthest in the ftiture from the current time unit and working back toward a portion of memory corresponding to the current time unit, performing the following for each time unit:
evaluating whether program data for the time unit is able to fit in the portion of memory allocated for the time period;
in an event that the program data does not fit, reducing the program data for the time unit until a reduced set of program data is able to fit in the portion of memory allocated for the time period; and
shifting any available space in the portion of memory that is unused to a next portion of memory corresponding to a next time unit closer to the current time unit;
upon reaching the portion of memory corresponding to the current time unit, storing program data for the current time unit in the portion of memory corresponding to the current time unit and shifting any remaining available space out to a portion of memory corresponding to a next closest time unit in the future from the current time unit; and
during a second pass beginning with a portion of memory corresponding to the next closest time unit and working forward toward the portion of memory corresponding to the time unit that is furthest in the future from the Current time unit, performing the following for each time unit:
evaluating whether any additional program data for the time unit is able to fit in the portion of memory allocated for the time period;

in an event that additional program data does not fit, adding the additional program data for the time unit; and shifting any remaining available space to a next portion of memory corresponding to a next time unit further out in the future from the current time unit; and upon reaching the portion of memory corresponding to the time unit furthest in the future, adding any additional program data to the portion of memory corresponding to the time unit furthest in the future.

15. A method as recited in claim 14, wherein the time-based units comprise 24-hour days.

16. A computer-readable medium encoded with computer-executable instructions that, when executed, direct a computing system to:

analyze whether program data for a time unit in an electronic program guide is able to fit in a portion of memory allocated for the time unit;

in an event that the program data does not fit, reduce the program data for the time unit until a subset of program data is able to fit in the portion of memory allocated for the time unit; and shift any remaining space that is not needed to store the subset of program data from the portion of memory to another portion of memory corresponding to another time unit, wherein the shift of the remaining space comprises:

making a first pass from a furthest time unit back toward a current time unit and determining at each time unit whether the program data for the time unit fits in the portion of memory allocated for the time unit and shifting any remaining space to the portion of memory allocated for a next time unit closer to the current time unit; and making a second pass from the current time unit out to the furthest time unit and determining at each time unit whether any additional program data for the time unit can be added to the portion of memory allocated for the time unit and shifting any remaining space to the portion of memory allocated for a next time unit closer to the furthest time unit.

17. A computer-readable medium as recited in claim 16, wherein the memory is allocated disproportionately over multiple time units such that more memory is allocated for the current time unit and progressively less memory is allocated for future time units, and further encoded with computer-executable instructions that, when executed, direct the computing system to repeat the analyze, reduce, and shift operations for the multiple time units such that more program data is eventually provided for the current time unit and progressively less program data is provided for future time units.

18. A computer system, comprising:
a memory;
a processor coupled to the memory; and
a time-based selector program stored in memory and executed on the processor to select different-size sets of electronic program guide (EPG) data for storage in a memory at a remote client such that disproportionate amounts of program data for corresponding time units represented by an EPG will be stored in the memory, wherein the time-based selector program is configured to:

make a first pass from a furthest time unit back toward a current time unit and determine at each time unit whether the program data for the time unit fits in the portion of memory allocated for the time unit and shift any remaining space to the portion of memory allocated for a next time unit closer to the current time unit; and make a second pass from the current time unit out to the furthest time unit and determine at each time unit whether any additional program data for the time unit can be added to the portion of memory allocated for the time unit and shift any remaining space to the portion of memory allocated for a next time unit closer to the furthest time unit.

19. A computer system as recited in claim 18, wherein the time-based selector program comprises instructions, that when executed on the processor, direct the computer system to:

analyze whether the program data for corresponding time units is able to fit in memory allocated for the time units; and in an event that the program data does not fit, reduce the program data for one or more time units until a subset of program data is able to fit in the memory allocated for the time units.

20. A computer system as recited in claim 18, wherein the time-based selector program comprises instructions, that when executed on the processor, direct the computer system to:

stipulate an initial allocation of the memory such that different-size portions of memory hold program data for different time units;

test whether the program data for the different time units fits in the portions of the memory; and adjust quantities of the program data for the different time units to identify a complete set of program data that fits in the memory.

21. A processing system, comprising:

allocation means for allocating memory into different-size portions that correspond with time units represented in an electronic program guide; and selection means for selecting different-size sets of program data for storage in the portions of memory such that more program data will be stored in one portion of memory corresponding to one time unit and less program data will be stored in another portion of memory for another time unit, wherein the selection means:

makes a first pass from a furthest time unit back toward a current time unit and determines at each time unit whether the program data for the time unit fits in the portion of memory allocated for the time unit and shifts any remaining space to the portion of memory allocated for a next time unit closer to the current time unit; and makes a second pass from the current time unit out to the furthest time unit and determines at each time unit whether any additional program data for the time unit can be added to the portion of memory allocated for the time unit and shifts any remaining space to the portion of memory allocated for a next time unit closer to the furthest time unit.

22. A processing system as recited in claim 21, wherein the selection means comprises analysis means for iteratively testing whether the program data for corresponding time units is able to fit in respective different-size portions of the memory and adjusting an amount of the program data to find a suitable quantity of program data for each of the time units that is able to fit within the respective different-size portions.

23. A processing system as recited in claim 21, further comprising distribution means for distributing the different-size sets of program data to a client that executes the electronic program guide.

24. A television entertainment system, comprising:
multiple clients to receive television signals and corresponding program data for an electronic program guide (EPG), the clients having a fixed amount of memory dedicated to storing the program data; and
an EPG server to select which program data for associated time units represented by the EPG is to be sent to the clients, the EPG server being configured to select different-size sets of program data for the associated time units such that more program data will be stored in the client memory for one time unit and less program data will be stored in the client memory for another time unit, wherein the EPG server is further configured to:
make a first pass from a furthest time unit back toward a current time unit and determine at each time unit whether the program data for the time unit fits in the portion of memory allocated for the time unit and shift any remaining space to the portion of memory allocated for a next time unit closer to the current time unit; and
make a second pass from the current time unit out to the furthest time unit and determine at each time unit whether any additional program data for the time unit can be added to the portion of memory allocated for the time unit and shift any remaining space to the portion of memory allocated for a next time unit closer to the furthest time unit.

25. A television entertainment system as recited in claim 24, wherein the EPG server creates a data file containing the different-size sets of program data.

* * * * *